(12) United States Patent
Yokochi et al.

(10) Patent No.: US 12,438,430 B2
(45) Date of Patent: Oct. 7, 2025

(54) LINEAR MOTOR WITH VARYING WIDTH SLIDER TEETH

(71) Applicant: OKUMA Corporation, Aichi (JP)

(72) Inventors: Takanori Yokochi, Aichi (JP); Tatsuya Shizu, Aichi (JP)

(73) Assignee: OKUMA, Aichi (JP)

( * ) Notice: Subject to any disclaimer, the term of this patent is extended or adjusted under 35 U.S.C. 154(b) by 253 days.

(21) Appl. No.: 18/193,936

(22) Filed: Mar. 31, 2023

(65) Prior Publication Data

US 2023/0318426 A1   Oct. 5, 2023

(30) Foreign Application Priority Data

Apr. 4, 2022   (JP) ................... 2022-062302

(51) Int. Cl.
*H02K 41/03*   (2006.01)

(52) U.S. Cl.
CPC .................... *H02K 41/031* (2013.01)

(58) Field of Classification Search
CPC ..... H02K 41/031; H02K 41/033; H02K 41/02
USPC ............. 310/12.18, 12.22, 12.24, 12.25, 181
See application file for complete search history.

(56) References Cited

U.S. PATENT DOCUMENTS

| | | | | |
|---|---|---|---|---|
| 5,218,250 | A * | 6/1993 | Nakagawa | H02K 41/033 310/156.55 |
| 2005/0082934 | A1* | 4/2005 | Kawai | H02K 21/44 310/181 |
| 2010/0259112 | A1* | 10/2010 | Chung | H02K 16/00 310/12.18 |
| 2014/0232209 | A1* | 8/2014 | Sugita | H02K 41/033 310/12.02 |
| 2017/0054355 | A1 | 2/2017 | Aoyama et al. | |
| 2020/0354194 | A1 | 11/2020 | Korhonen | |

FOREIGN PATENT DOCUMENTS

| | | |
|---|---|---|
| CN | 111655604 A | 9/2020 |
| JP | 2006109639 A | 4/2006 |
| JP | 2015208173 A | 11/2015 |
| JP | 6949269 B1 | 9/2021 |
| WO | 2021052564 A1 | 3/2021 |

OTHER PUBLICATIONS

JPO Notice of Reasons for Refusal for corresponding JP Application No. 2022-0623023; Issued Jun. 3, 2025.

* cited by examiner

*Primary Examiner* — Michael Andrews
(74) *Attorney, Agent, or Firm* — I CANTOR COLBURN LLP (57) ABSTRACT

A linear motor includes a stator having a plurality of salient poles, and a slider configured to move along a direction of extension of the stator. A U-phase coil core of the slider includes a yoke, a plurality of teeth, permanent magnets provided in respective magnet-receiving cavities located between the teeth, coil-receiving cavities formed on outer sides of the teeth set, and a U-phase coil wound in the coil-receiving cavities. The plurality of teeth project radially from the yoke toward the stator, and the width of each of the teeth as measured at the yoke side is narrower than its width as measured at the stator side.

4 Claims, 8 Drawing Sheets

LINEAR MOTOR WITH VARYING WIDTH SLIDER TEETH

CROSS REFERENCES TO RELATED APPLICATIONS

The present invention claims priority under 35 U.S.C. § 119 to Japanese Application, 2022-062302, filed on Apr. 4, 2022, the entire contents of which being incorporated herein by reference.

TECHNICAL FIELD

The present disclosure relates to a structure of a linear motor having permanent magnets inserted in a slider.

BACKGROUND

Various structures are possible for a linear motor composed of a slider, which is a driven part, and a stator, which is a fixed part, various structures are possible. For example, see JP 2006-109639 A. Among the various structures, a structure of a linear motor having permanent magnets and coils provided in a slider will be described below.

Figure 4:
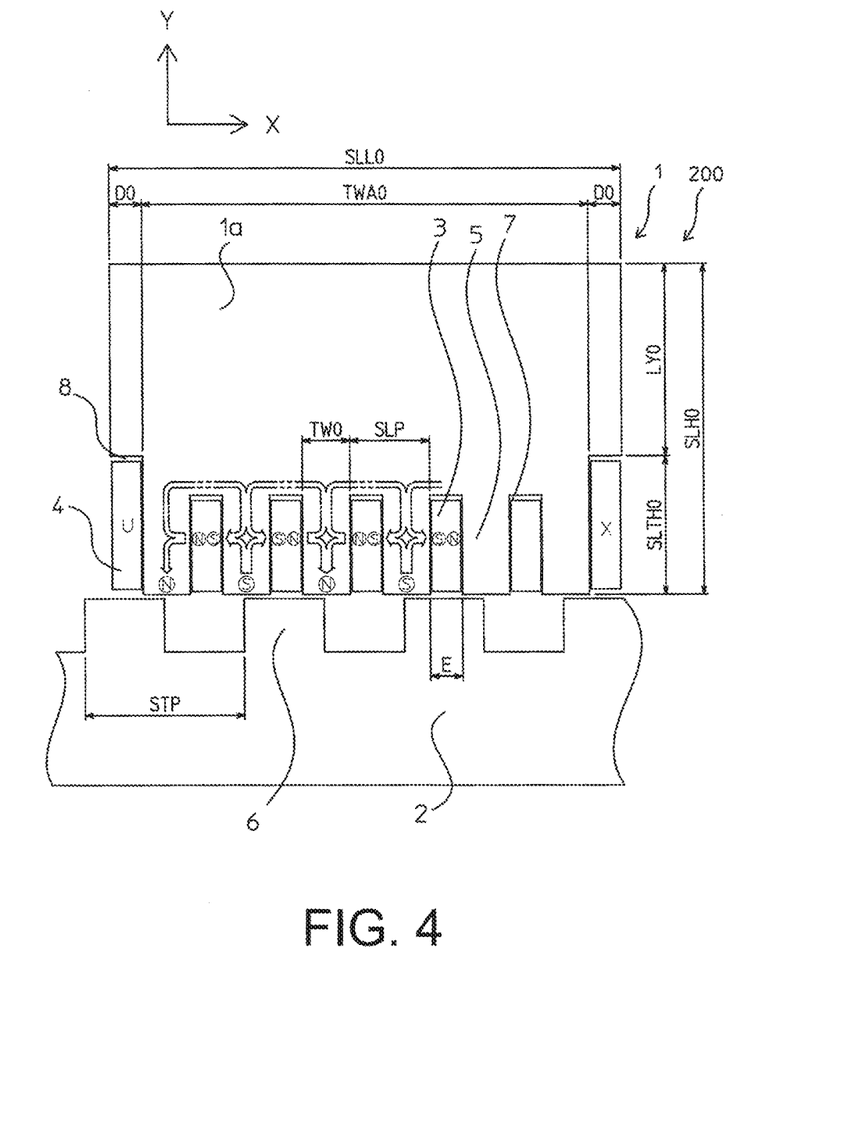
FIG. 4 is a cross-sectional view of a U-phase coil core of a linear motor according to a conventional art.

FIG. 4 is a diagram showing an example cross-sectional structure of a U-phase coil core 1a formed by embedding magnets in a linear motor 200 according to a conventional art. As will described later by reference to FIG. 6, the linear motor 200 of the conventional art is composed of a stator 2 and a slider 1, and the slider 1 comprises the U-phase coil core 1a, a W-phase coil core 1b, and a V-phase coil core 1c located sequentially along an X direction. The length of the slider 1 in the X direction is SLLT0, and its height in the Y direction is SLH0. As shown in FIG. 4, the length of the U-phase coil core 1a in the X direction is a length SLL0. Since the structures of the W-phase coil core 1b and the V-phase coil core 1c are identical with that of the U-phase coil core 1a, the structure of the U-phase coil core 1a alone will be described below. In each of the drawings, the X direction denotes a direction of movement of the slider 1, while the Y direction denotes a direction orthogonal to the X direction.

As shown in FIG. 4, the U-phase coil core 1a is located facing the stator 2, and is configured to move in the X direction while maintaining a constant distance from the stator 2. Both of the U-phase coil core 1a and the stator 2 have a structure formed by laminating silicon steel sheets in a direction perpendicular to the drawing plane. In the U-phase coil core 1a, parts extending toward the stator 2 with a constant width TW0 are referred to as teeth 5. Further, in the U-phase coil core 1a, magnet-receiving cavities 7 and coil-receiving cavities 8 are provided. The magnet-receiving cavities 7 are slits having a width E, and on the inside thereof, permanent magnets 3 having a rectangular cross section with the width E are respectively placed with their magnetic poles oriented in the horizontal direction in the drawing. Here, the magnetic poles of the permanent magnets 3 are such that poles of the same polarity of mutually adjacent permanent magnets face each other. For example, assuming that the leftmost permanent magnet is placed with its N pole facing toward the left and its S pole facing toward the right, the immediately adjacent permanent magnet on the right is placed with its S pole facing toward the left and its N pole facing toward the right. In this way, in mutually adjacent permanent magnets, the directions of the magnetic poles are opposite, and the magnetic poles of the same polarity face each other. According to this arrangement, magnetic flux flows in the teeth 5 as shown by double-dot dash lines in the drawing. For example, an outgoing magnetic flux from an N pole branches into a magnetic flux advancing toward the stator 2 and a magnetic flux advancing in a direction opposite the stator 2. Among these, the magnetic flux advancing in the direction opposite the stator 2 goes around the magnet-receiving cavities 7 and enters into S poles. Meanwhile, the magnetic flux advancing toward the stator 2 proceeds as such and enters the stator 2 through a salient pole 6 of the stator 2. At that time, viewing from the stator 2, magnetic poles are arranged at the tips of the teeth 5 in an alternating sequence of N pole, S pole, N pole, S pole, and so on.

The teeth 5 on the U-phase coil core 1a are located at a constant pitch SLP. This pitch SLP is equal to a sum of the width E of the permanent magnet 3 and the width TW0 of the teeth 5. Further, in the stator 2, the part that faces the U-phase coil core 1a is shaped as salient poles. These salient poles 6 are similarly located at a constant pitch STP. Here, the relationship between STP and SLP is expressed by the following equation.

$$STP = SLP \times 2 \qquad \text{(Equation 1)}$$

The pitch STP of the salient poles 6 is two times the pitch SLP of the teeth 5. According to this arrangement, all of the same polarity poles of the teeth 5 are placed in the same positional relationship relative to the salient poles 6 of the stator 2.

Figure 5:
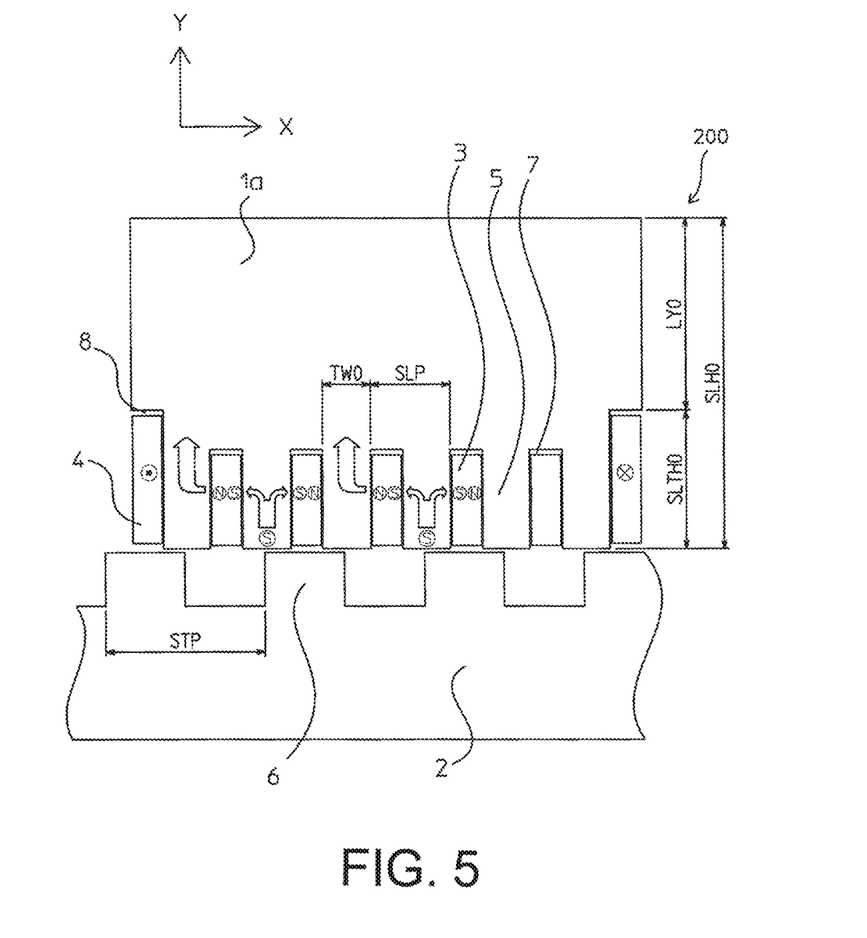
FIG. 5 is an explanatory diagram showing magnetic flux flow at a time when a current is caused to flow in a U-phase coil on the U-phase coil core of the linear motor according to the conventional art.

On the outer sides of the plurality of teeth 5, the coil-receiving cavities 8 are formed. The width of each coil-receiving cavity 8 in the X direction is a width D0. In the coil-receiving cavities 8, a U-phase coil 4 is provided. The coil 4 is wound between the coil-receiving cavities 8 shown at two locations in the drawing. When a current is caused to flow in the coil 4, magnetic flux is formed in a direction parallel to the teeth 5 in accordance with the right-hand corkscrew rule. By means of this magnetic flux, the magnetic flux that has already been generated in the teeth 5 by the permanent magnets 3 is strengthened or weakened. For example, as shown in FIG. 5, when a current is caused to flow such that the current flow in the coil 4 shown on the left side in the drawing is in a direction from within to out of the drawing plane and the current flow in the coil 4 shown on the right side is in a direction from outside into the drawing plane, magnetic flux flows in a direction from below upward in each of the teeth 5 surrounded by the coil 4. As a result, among the magnetic flux that has been formed by the permanent magnets 3, the magnetic flux in the direction from below upward is strengthened, while the magnetic flux in the direction from above downward is weakened. Since the strength of magnetic field formed by causing a current to flow in the coil 4 is proportional to the magnitude of the current caused to flow in the coil 4, the weakened magnetic flux may be cancelled to zero. When the weakened magnetic flux is cancelled to zero, the flow of magnetic flux becomes as shown in the drawing. That is, among the outgoing magnetic flux from the N poles of the permanent magnets 3, the magnetic flux advancing toward the stator 2 is cancelled to zero, while the magnetic flux advancing in the direction opposite to the stator 2 is strengthened by the magnetic flux generated by the coil 4. Meanwhile, on the S-pole side of the permanent magnets 3, incoming magnetic flux from the direction opposite the stator 2 is cancelled to zero, while incoming magnetic flux from the stator 2 is strengthened. As a result, viewing from the stator 2, the magnetic poles at the teeth 5 that had previously been N poles have disappeared, and only S poles remain present at every other one of the teeth 5.

When the teeth 5 and the salient poles 6 are in a state of directly facing each other, force generated between the U-phase coil core 1a and the stator 2 only includes magnetic attraction force working in the vertical direction in the drawing, and includes no thrust force for moving the U-phase coil core 1a toward the left or the right. However, from that state, when the positions of the U-phase coil core 1a and the stator 2 shift toward the left and the right, the magnetic attraction force becomes gradually reduced, and in turn the thrust force is increased. Further, the magnitudes of these forces not only depend on the positional relationship but are also proportional to the strength of magnetic field in the teeth 5. Accordingly, a desired thrust force can be obtained by controlling the positional relationship between the teeth 5 and the salient poles 6 and the strength of magnetic field in the teeth 5. The purpose of causing a current to flow in the coil 4 is to obtain a desired thrust force by controlling the strength of magnetic field in the teeth 5 in accordance with positions of the teeth 5 and the salient poles 6.

Figure 6:
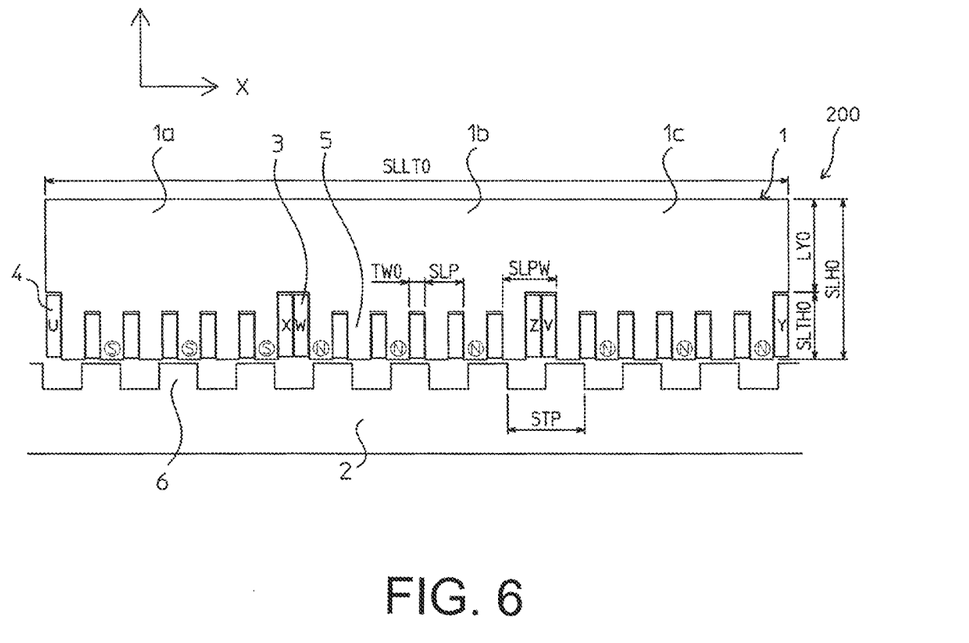
FIG. 6 is a diagram showing an example cross-sectional structure of the linear motor according to the conventional art.

As shown in FIG. 6, the slider 1 comprises the U-phase coil core 1a, the W-phase coil core 1b, and the V-phase coil core 1c located sequentially along the X direction. As noted above, the structures of the W-phase coil core 1b and the V-phase coil core 1c are identical to that of the U-phase coil core 1a, with a W-phase coil wound around the W-phase coil core 1b and a V-phase coil wound around the V-phase coil core 1c. In the drawing, the U-phase coil is wound in parts denoted by U and X, the V-phase coil is wound in parts denoted by V and Y, and the W-phase coil is wound in parts denoted by W and Z. As is known, currents caused to flow in three-phase coils are phase-shifted from each other by an electrical angle of 120 degrees. It is therefore necessary to arrange the positions of the teeth 5 in accordance therewith. Since an electrical angle of 360 degrees as referred to herein is equal to the pitch STP of the salient poles 6, a teeth spacing SLPW across a part in which the coils 4 are placed is shifted relative to the salient poles 6 by an electrical angle of 120 degrees or 240 degrees, which, when stated in terms of the pitch, corresponds to STP×⅓ or STP×⅔. Such can be expressed in equations as follows, where n is an integer.

$$SLPW = SLP \times n + STP \times \tfrac{1}{3} \quad \text{(Equation 2)}$$

$$SLPW = SLP \times n + STP \times \tfrac{2}{3} \quad \text{(Equation 3)}$$

By arranging the positions of the teeth 5 as described above, thrust force can be efficiently generated between the slider 1 and the stator 2 by causing three-phase alternating currents to flow in the coils.

It has been described above with reference to FIG. 5 that, when a current is caused to flow in the coil 4, viewing from the stator 2, only poles of the same polarity remain present at every other one of the teeth 5. In a case where, as shown in FIG. 6, the three-phase coils are wound and the U-phase coil core 1a, the W-phase coil core 1b, and the V-phase coil core 1c are located sequentially, when, for example, the same current as in FIG. 5 is caused to flow in the U-phase coil, a current shifted by 120 degrees is to flow in the V-phase coil, and a current shifted by 240 degrees is to flow in the W-phase coil. Assuming that a current having a peak value is caused to flow in the U-phase, a current having a value that is half of the U-phase current value and flowing in the opposite direction is to flow in the V-phase and the W-phase. Accordingly, as shown in FIG. 6, there is obtained a state in which, viewing from the stator 2, strengthened N poles are arranged sequentially in the V-phase and the W-phase, in contrast to in the U-phase. In the above description with reference to FIG. 5, it has been explained that magnetic flux is generated from the N-pole teeth in the direction opposite to the stator 2. Since magnetic flux is cancelled in the adjacent teeth, the magnetic flux from the N-pole teeth cannot enter the S poles of the permanent magnets 3 and has nowhere to go. However, in a case where three coils are located sequentially as shown in FIG. 6, the U-phase magnetic flux having nowhere to go can connect with magnetic flux generated in the opposite direction in the V-phase and the W-phase, and can enter the permanent magnets 3. A part where the magnetic flux passes at that time is referred to as a yoke. In the yoke, a size of a part where a width orthogonal to the direction of the magnetic flux is the smallest, namely, a size in the Y direction denoted by LY0 in FIG. 6, is referred to as a yoke height. This yoke height LY0 is set to the smallest value within a range in which the magnetic flux does not become saturated when current is caused to flow in the coils 4.

When deciding on sizes of respective parts in designing a slider 1, first, the width of the permanent magnets 3 is decided based on demagnetization resistance of the magnets, and then the width of the teeth 5 is set to the smallest value within a range in which magnetic flux caused by the permanent magnets 3 does not become saturated in the teeth 5 even when current is caused to flow in the coils 4 and the current strength is increased. A sum of these two widths corresponds to the pitch SLP of the teeth 5, as noted above. Further, the spacing SLPW of the teeth 5 across a part in which the coils 4 are placed is determined based on either one of the above-noted Equation 2 and Equation 3. Meanwhile, a sum of the yoke height LY0 and a height SLTH0 of the coil-receiving cavities 8 is to correspond to the height SLH0 of the slider 1. The width D0 of the coil-receiving cavities 8 is determined based on an amount of coil wire to be placed therein. The amount of coil wire can be determined from a product obtained by multiplying a number of coil windings, which is referred to as a number of turns, and a coil cross-sectional area per one turn. Thrust force generated by the motor is proportional to the number of turns and a flowing current value, and heat generated at the time of current flow is inversely proportional to the coil cross-sectional area. Accordingly, the number of turns is determined based on required thrust force and the flowing current value. The determined number of turns is then used to calculate a coil resistance value used for suppressing the amount of generated heat at the time of current flow to a desired amount, and the coil cross-sectional area is determined based thereon. Using these values, the necessary amount of coil wire is determined, and the size of the coil-receiving cavities 8 can be determined based thereon. Once the size of the coil-receiving cavities 8 is determined, since the width D0 is calculated to be half of a value obtained by subtracting the width TW0 of the teeth from the teeth spacing SLPW determined according to Equation 2 or Equation 3, that is, D0=(SLPW−TW0)/2, the height SLTH0 of the coil-receiving cavities 8 is determined based thereon.

As a motor characteristic, it is generally required that desired force is generated within a predetermined motor volume while suppressing generated heat below a specified value. In a situation where desired force cannot be obtained, since there typically is a limitation to the magnitude of flowing current, the situation is addressed by increasing the number of turns. However, when the number of turns is increased, the coil resistance value increases, so that generated heat also increases proportionally. In order to reduce the coil resistance value and suppress generated heat even when the number of turns is increased, the coil cross-sectional area is increased. One method of increasing the coil cross-sectional area is to use a coil wire having a large diameter to thereby make the cross-sectional area larger. However, since a thick coil wire is stiff and cannot be freely bent, it is difficult to wind such a coil wire. In view of this, a plurality of thin wires are typically bundled and used as one wire. The number of wires bundled at that time is referred to as a number of parallels. Since coil resistance and generated heat are inversely proportional to the number of parallels, a motor capable of generating large force with little heat generation can be designed by increasing the number of turns until desired thrust force can be obtained and then increasing the number of parallels. However, an increase in the number of parallels leads to an increase in the amount of coil wire, which would result in an exceedingly large cross-sectional area of the coil-receiving cavities 8.

Figure 7:
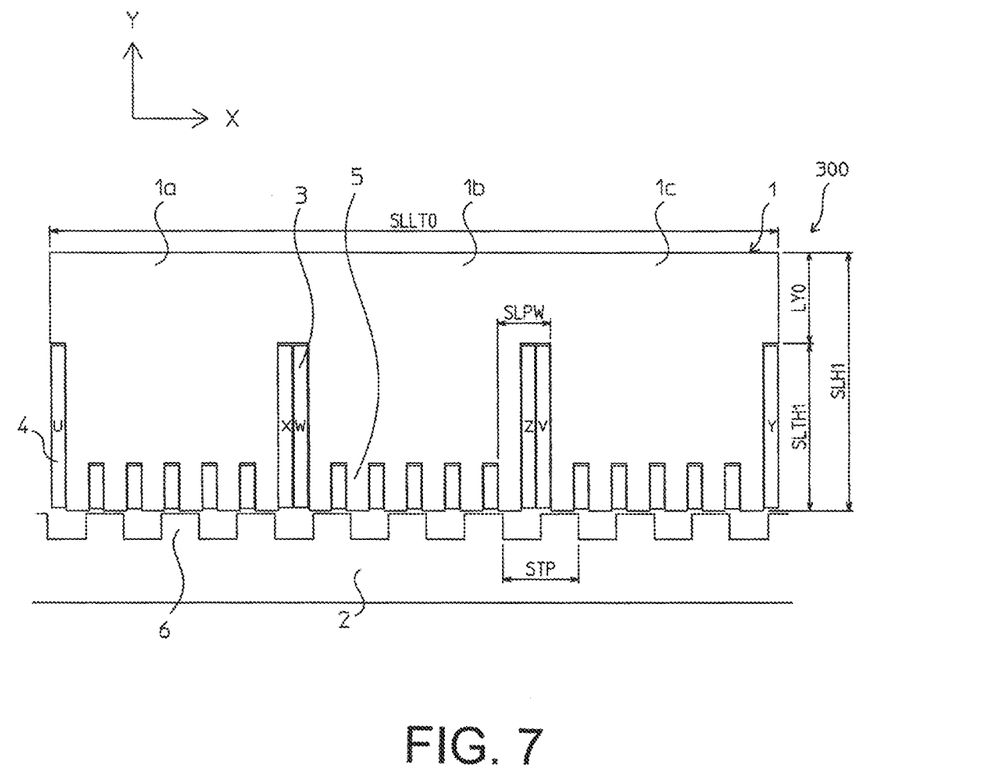
FIG. 7 is a diagram showing an example cross-sectional structure of another linear motor according to a conventional art.
Figure 8:
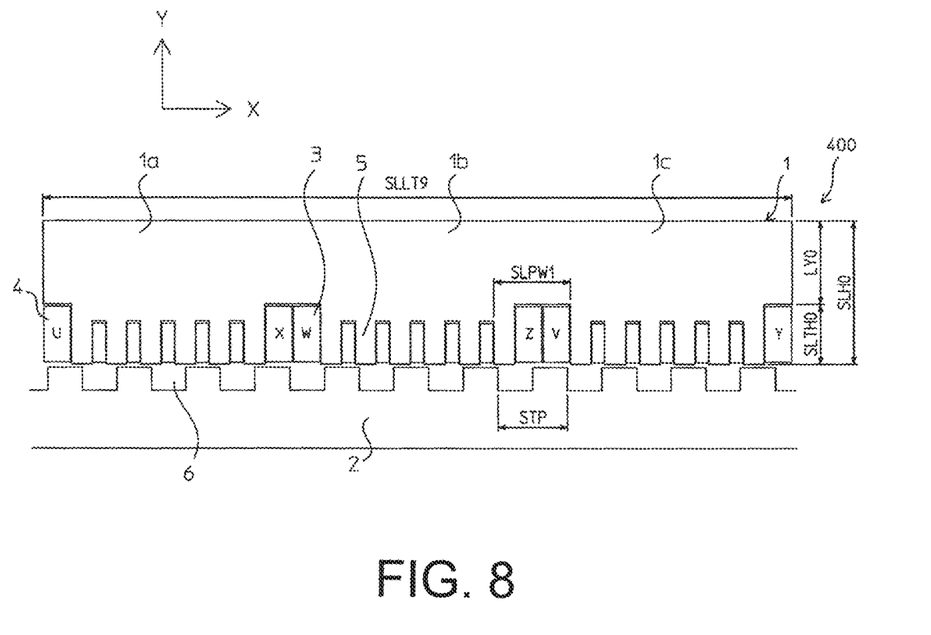
FIG. 8 is a diagram showing an example cross-sectional structure of another linear motor according to a conventional art.

If the cross-sectional area of the coil-receiving cavities 8 is to be increased while maintaining the current pitch SLP of the teeth 5 and the current spacing SLPW of the teeth 5 across a part in which the coils 4 are placed, it would be necessary to adopt an increased slot height SLTH1 as in another linear motor 300 shown in FIG. 7. Since the yoke height LY0 cannot be changed, the height SLH1 of the slider 1 would consequently become larger than before. Instead, if, as in a linear motor 400 of a conventional art shown in FIG. 8, the teeth spacing is widened to SLPW1 according to Equation 2 or Equation 3 and the width DO of the coil-receiving cavities 8 is thereby increased, the length of the slider 1 in the X direction would consequently become prolonged as shown by a length SLLT9. As such, attempts to satisfy the conflicting requirements to increase thrust force and to reduce heat generation would result in an increased motor size, and creating a design within a predetermined volume would be impossible.

In view of the above, the present disclosure is directed to increasing thrust force and reducing heat generation without increasing motor volume.

SUMMARY

A linear motor according to an aspect of the present disclosure includes a stator having a plurality of salient poles arranged at uniform intervals along a direction of extension, and a slider provided facing the stator and configured to move along the direction of extension of the stator. The slider includes: a yoke; a plurality of teeth projecting from the yoke toward the stator and located sequentially along a direction of movement; permanent magnets provided in respective magnet-receiving cavities located between the teeth; coil-receiving cavities formed on outer sides of a teeth set composed of the plurality of teeth; and a coil wound in the coil-receiving cavities. The plurality of teeth project radially from the yoke toward the stator, and a width of each of the teeth as measured at a yoke side is narrower than its width as measured at a stator side.

As noted above, the linear motor is configured such that the plurality of teeth project radially from the yoke toward the stator, and the width of each of the teeth as measured at the yoke side is narrower than its width as measured at the stator side. Accordingly, a width of the teeth set in the direction of movement as measured at the yoke side can be reduced, and a width, as measured at the yoke side, of the coil-receiving cavities formed on the outer sides of the teeth set can be increased. Further, by reducing the width of the teeth as measured at the yoke side, magnetic flux passing through the yoke can be reduced, so that it becomes possible to decrease the yoke height and increase the height of the coil-receiving cavities. As a result, without increasing motor volume, the cross-sectional area of the coil-receiving cavities can be made larger and the amount of coil wire can be increased, thereby enabling an increase in thrust force and a reduction in heat generation.

In the linear motor according to an aspect of the present disclosure, the plurality of teeth may project radially from the yoke toward the stator at equiangular intervals, and widths of all of the teeth as measured at their respective ends at the yoke side may be equal to each other.

With the above-noted feature, flow of magnetic flux in each of the teeth can be made smooth, and heat generation can be reduced.

The linear motor according to an aspect of the present disclosure may be configured such that each of teeth located toward the front in the teeth set has its tip slanted frontward relative to a facing direction orthogonal to the direction of movement, and each of teeth located toward the rear in the teeth set has its tip slanted rearward relative to the facing direction. A space in front of a front-end tooth located at a front end of the teeth set in the direction of movement and a space behind a rear-end tooth located at a rear end of the teeth set in the direction of movement may respectively constitute the coil-receiving cavities.

With the above-noted feature, the width of the coil-receiving cavities in the direction of movement as measured at the yoke side can be increased, and the cross-sectional area of the coil-receiving cavities can be increased, thereby enabling an increase in thrust force and a reduction in heat generation without increasing motor volume.

By using the present disclosure, it is possible to provide, without increasing motor volume, a linear motor which provides enhanced thrust force while reducing heat generation.

BRIEF DESCRIPTION OF DRAWINGS

Embodiment(s) of the present disclosure will be described based on the following figures, wherein.

DESCRIPTION OF EMBODIMENTS

Figure 1:
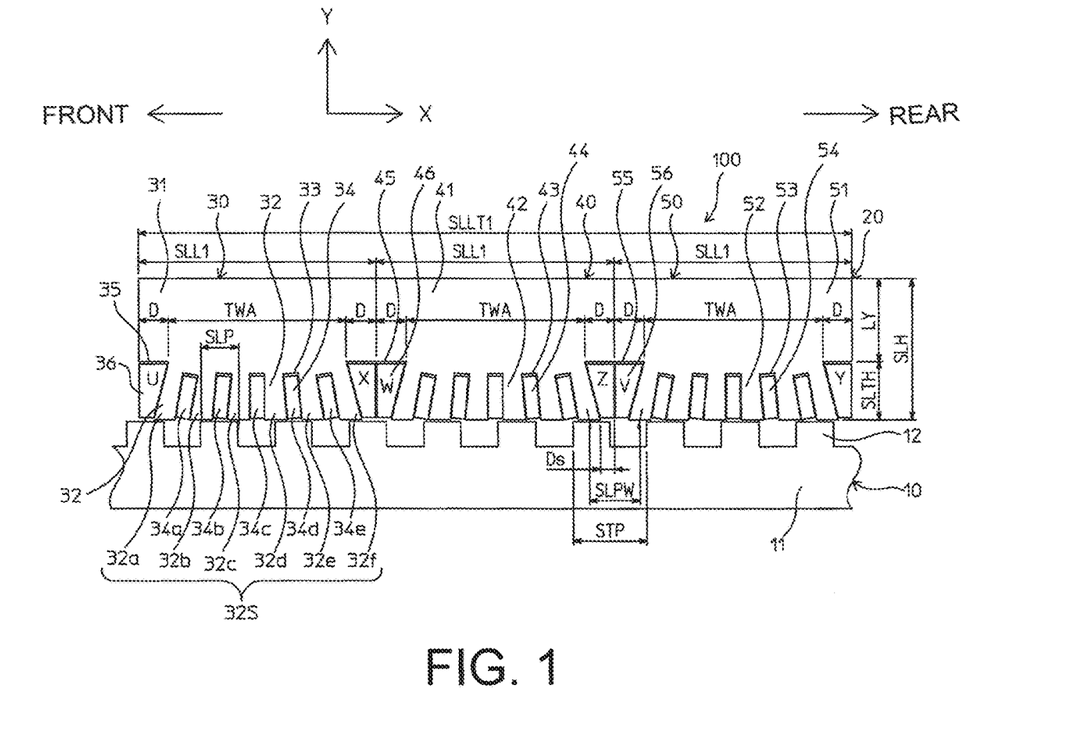
FIG. 1 is a cross-sectional view showing a schematic configuration of a linear motor according to an embodiment.

A linear motor 100 according to an embodiment will now be described by reference to the drawings. As shown in FIG.

1, the linear motor 100 is composed of a stator 10 and a slider 20. Here, in each of the drawings, an X direction denotes a direction of extension of the stator 10 or a direction of movement of the slider 20. A Y-direction denotes a facing direction orthogonal to the X direction which is the direction of movement. In the following description, a negative side of the X direction is referred to as a frontward direction of the slider 20, and a positive side of the X direction is referred to as a rearward direction of the slider 20.

The stator 10 is formed by, for example, laminating silicon steel sheets. The stator 10 is composed of an elongate stator yoke 11 extending in the X direction, and a plurality of salient poles 12 projecting from an end face, in the Y direction, of the stator yoke 11 toward a positive side of the Y direction. The salient poles 12 are located sequentially along the X direction at uniform intervals of pitch STP.

The slider 20 is formed by, for example, laminating silicon steel sheets, and faces the stator 10 in the Y direction. The slider 20 is composed of a U-phase coil core 30, a W-phase coil core 40, and a V-phase coil core 50 located sequentially along the X direction. The length of the slider 20 in the X direction is SLLT1, and its height in the Y direction is SLH. The length, in the X direction, of all of the U-phase coil core 30, the W-phase coil core 40, and the V-phase coil core 50 is length SLL1.

The U-phase coil core 30 comprises a yoke 31 having a height LY in the Y direction, and a plurality of teeth 32a-32f which project from the yoke 31 toward the stator 10 toward a negative side of the Y direction and which are arranged sequentially along the X direction. In magnet-receiving cavities 33 located between the teeth 32a-32f, permanent magnets 34a-34e are mounted respectively. Further, the teeth 32a-32f constitute one teeth set 32S, and on outer sides of the teeth set 32S, coil-receiving cavities 35 are formed. The length of the teeth set 32S in the X direction as measured at the yoke side is TWA. The width of each coil-receiving cavity 35 in the X direction as measured at the yoke side is D, and its length in the Y direction is SLTH. A U-phase coil 36 is wound in the coil-receiving cavities 35 in parts denoted by U and X. Here, when making no distinction among the respective teeth 32a-32f and among the respective permanent magnets 34a-34e, these will be simply referred to as the teeth 32 and the permanent magnets 34.

Each of the W-phase coil core 40 and the V-phase coil core 50 has the same structure as the U-phase coil core 30, and comprises a yoke 41, 51 and a plurality of teeth 42, 52. In magnet-receiving cavities 43, 53 located between the teeth 42 and between the teeth 52, permanent magnets 44, 54 are mounted respectively. Further, in coil-receiving cavities 45, 55 located on outer sides of the teeth 42 constituting one set and on outer sides of the teeth 52 constituting one set, a W-phase coil 46 and a V-phase coil 56 are wound. The W-phase coil 46 is wound in parts denoted by W and Z in FIG. 1, and the V-phase coil 56 is wound in parts denoted by V and Y in FIG. 1.

The teeth 32 of the U-phase coil core 30, the teeth 42 of the W-phase coil core 40, and the teeth 52 of the V-phase coil core 50 are arranged by being respectively shifted in the X direction relative to the salient poles 12 of the stator by a pitch STP/3, which corresponds to an electrical angle of 120 degrees. Each of the spacing between the teeth 32 and the teeth 42 across the coil-receiving cavities 35, 45 and the spacing between the teeth 42 and the teeth 52 across the coil-receiving cavities 45, 55 is SLPW, which is identical to that of the conventional art shown in FIG. 6, and is defined by Equation 2.

Figure 2:
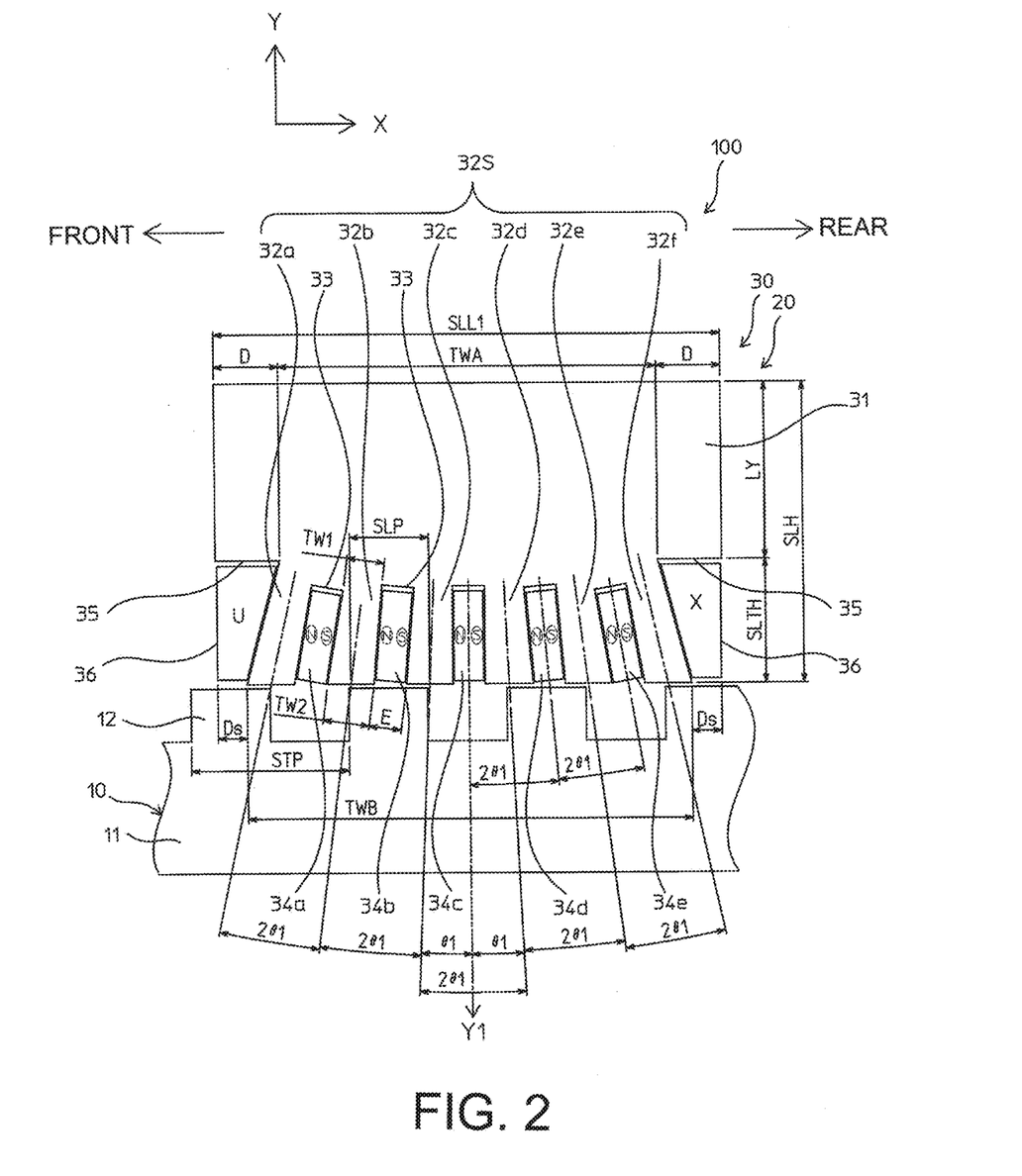
FIG. 2 is a cross-sectional view showing a U-phase coil core of the linear motor according to the embodiment.

Next, the structure of the U-phase coil core 30 will be described in detail by reference to FIG. 2. As shown in FIG. 2, the teeth 32a-32f project toward the stator 10 in a manner slanted relative to the Y direction. As shown in FIG. 2, assuming that an axis located at the center of the U-phase coil core 30 in the X direction and extending toward the negative side of the Y direction is a Y1 axis, two central teeth 32c, 32d of the U-phase coil core 30 are slanted frontward and rearward, respectively, relative to the Y1 axis by an angle of θ1. Further, two teeth 32b, 32e located adjacently on outer sides thereof are slanted frontward and rearward relative to the central teeth 32c, 32d at an angle of 2θ1. Furthermore, a front-end tooth 32a and a rear-end tooth 32f, which are the outermost teeth, are slanted frontward and rearward relative to the teeth 32b, 32e at an angle of 2θ1. In this way, in the teeth set 32S, each of the teeth 32a-32c located toward the front has its tip slanted frontward relative to the Y1 axis, and each of the teeth 32d-32f located toward the rear has its tip slanted rearward relative to the Y1 axis.

Here, since the angle between the two central teeth 32c, 32d is 2θ1, each of the teeth 32a-32f is arranged at an angle of 2θ1 relative to its adjacent teeth, and the teeth 32a-32f project radially from the yoke 31 toward the stator 10 at equiangular intervals of the angle 2θ1. Further, a space in front of the front-end tooth 32a of the teeth set 32S in the X direction and a space behind the rear-end tooth 32f of the teeth set 32S in the X direction respectively constitute the coil-receiving cavities 35.

At respective centers of parts between the teeth 32a-32f, the magnet-receiving cavities 33 are provided. The magnet-receiving cavities 33 are slits having a constant width E, in which the permanent magnets 34 having a rectangular cross section are mounted as shown in FIG. 2. Although each of the teeth 32a-32f is arranged at an angle of 2θ1 relative to its adjacent teeth, each magnet-receiving cavity 33 has a rectangular cross section, and its two opposite sides are parallel. Accordingly, a front surface and a rear surface of each tooth 32a-32f are not parallel to each other, and the width decreases from near the stator 10 toward the yoke 31. As shown in FIG. 2, a width TW1 of each tooth 32a-32f at the yoke side is narrower than its width TW2 at the stator side.

Further, when midpoints of tip end sides of the respective teeth 32a-32f are referred to as the centers of the teeth 32a-32f, pitches SLP between the centers of the teeth 32a-32f in the X direction satisfy Equation 1 relative to the pitch STP of the salient poles 12 of the stator 10 as in the conventional art, and all of the pitches SLP are identical in size. Here, the width of the salient poles 12 of the stator 10 is equivalent to that in the conventional art.

Since the magnet-receiving cavities 33 are provided at the centers of the parts between the teeth 32a-32f, each of the magnet-receiving cavities 33 is arranged at an angle of 2θ1 relative to its adjacent magnet-receiving cavities 33, and the magnet-receiving cavities 33 extend radially from the yoke 31 toward the stator 10 at equiangular intervals of the angle 2θ1, in a manner similar to the teeth 32a-32f.

In the magnet-receiving cavities 33, the permanent magnets 34a-34e are mounted respectively. The permanent magnets 34a-34e have a rectangular cross section with a width E. As in the conventional art, the permanent magnets 34a-34e are mounted such that the magnetic poles are oriented in a direction orthogonal to longer sides of the permanent magnets 34a-34e, and such that poles of the same polarity face each other across the teeth 32a-32e.

Since the permanent magnets 34a-34e are mounted in the magnet-receiving cavities 33, each of the permanent magnets 34a-34e is arranged at an angle of 2θ1 relative to its adjacent permanent magnets, and the permanent magnets 34a-34e are arranged such that directions of the longer sides extend radially from the yoke 31 toward the stator 10 at equiangular intervals of the angle 2θ1.

According to the above-described configuration, a length TWB of the teeth set 32S in the X direction as measured at the stator side is as below.

$$TWB \approx TW2 \times 6 + 5 \times E \quad \text{(Equation 4)}$$

Here, since the width TW2 of the teeth 32a-32f as measured at the stator side is approximately equal to the width TW0 of the conventional-art teeth 5 shown in FIG. 4, and the width E of the permanent magnets is also approximately equal to the width E of the conventional-art permanent magnets 3, TWB is approximately equal to a length TWA0 of the conventional-art teeth set in the X direction. In Equation 4, influences of the angles of slant of the teeth 32a-32f and the permanent magnets 34a-34e are small, and are therefore ignored.

Meanwhile, a length TWA of the teeth set 32S in the X direction as measured at the yoke side is as below.

$$TWA \approx TW1 \times 6 + E \times 5 \quad \text{(Equation 5)}$$

In Equation 5, influences of the angles of slant of the teeth 32a-32f and the permanent magnets 34a-34e are ignored as in Equation 4.

Since TW1<TW2 as noted above, the following holds true.

$$TWA < TWB \approx \text{length } TWA0 \text{ of conventional-art teeth set in } X \text{ direction} \quad \text{(Equation 6)}$$

As such, in the U-phase coil core 30 of the linear motor 100 according to the present embodiment, the length TWA of the teeth set 32S in the X direction as measured at the yoke side becomes shorter than the length TWA0, in the X direction, of the conventional-art teeth set shown in FIG. 4. As a result, when the length SLL1 of the U-phase coil core 30 in the X direction is made identical to the X-direction length SLL0 of the conventional-art U-phase coil core 1a, the X-direction width D, as measured at the yoke side, of the coil-receiving cavities 35 formed on the outer sides of the teeth set 32S can be increased as compared to the width D0 of the conventional-art coil-receiving cavities 8.

Here, as described above by reference to FIG. 1, the spacing between the teeth 32, 42 across the coil-receiving cavities 35, 45 is SLPW, which is identical to that of the conventional art shown in FIG. 6, and the width TW2 of the tip end of the teeth 32 is approximately equal to the width TW0 of the conventional-art teeth 5 shown in FIG. 4, so that a width Ds of the coil-receiving cavities 35 as measured at the stator side is as below.

$$Ds = (SLPW - TW2)/2 \approx (SLPW - TW0)/2 = D0 \quad \text{(Equation 7)}$$

The width Ds is approximately identical to the width D0 of the coil-receiving cavities 8 in the conventional-art U-phase coil core 1a shown in FIG. 4.

Figure 3:
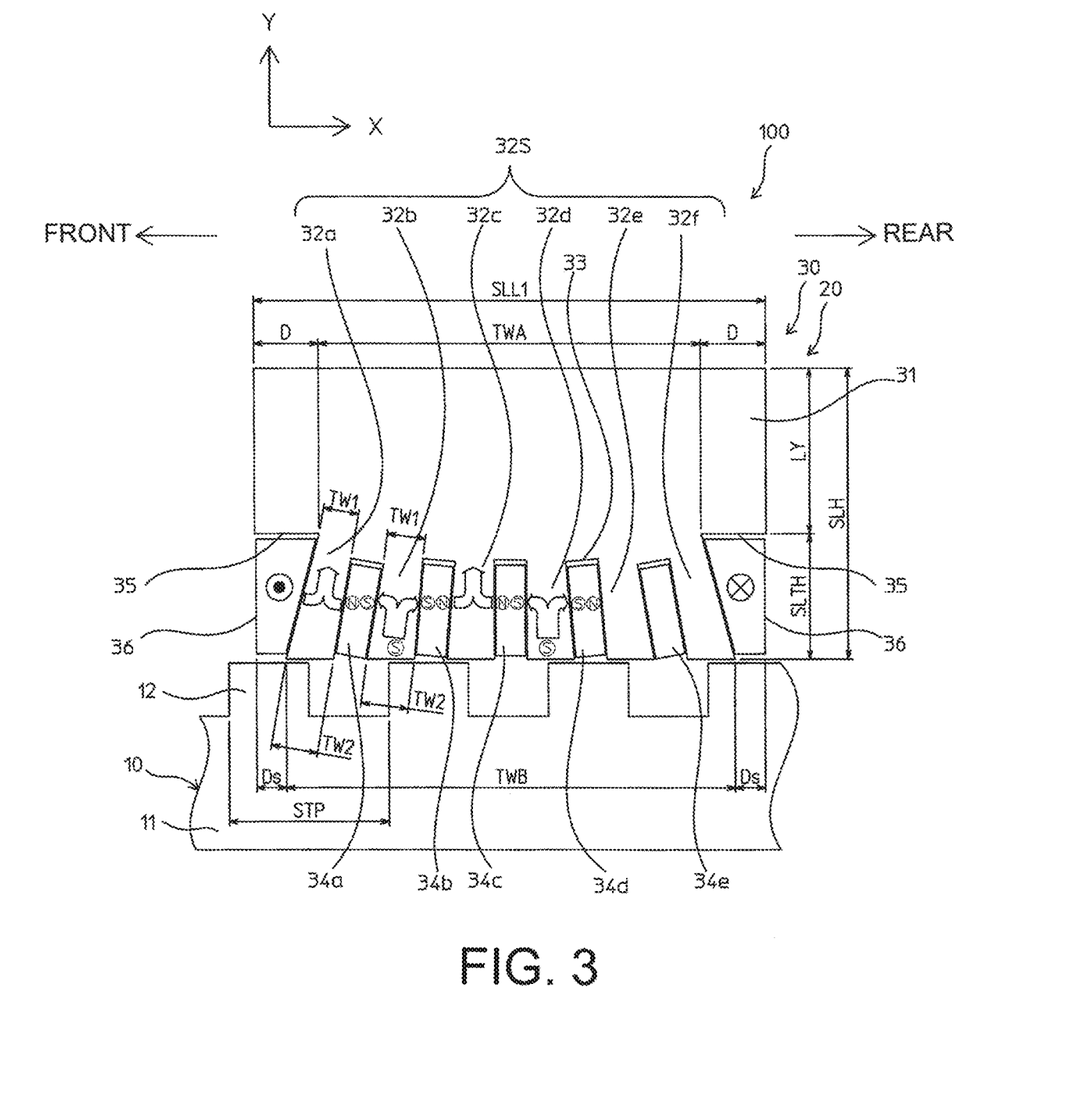
FIG. 3 is an explanatory diagram showing magnetic flux flow at a time when a current is caused to flow in a U-phase coil on the U-phase coil core of the linear motor according to the embodiment.

Next, flow of magnetic flux generated in the teeth 32a-32f when a current is caused to flow in the coil 36 will be described by reference to FIG. 3. When a current is caused to flow in the coil 36, magnetic flux generated in accordance with the right-hand corkscrew rule serves to strengthen or weaken the magnetic flux in the teeth 32a-32f as in the conventional art. As shown in FIG. 3, the leftmost permanent magnet 34a has its N pole on the left and its S pole on the right, and the permanent magnets 34b-34e are then sequentially arranged such that poles of the same polarity face each other. In this arrangement, when a current is caused to flow such that the current flow in a portion of the coil 36 shown on the left side is in a direction from within to out of the drawing plane and the current flow in a portion of the coil 36 shown on the right side is in a direction from outside and into the drawing plane, magnetic flux is generated in the part between the coil 36 portions in a direction toward the positive side of the Y direction according to the right-hand corkscrew rule. As a result, magnetic flux generated from the N poles of the permanent magnets 34a-34e and advancing toward the stator 10 toward the negative side of the Y direction is weakened, while magnetic flux advancing in the direction opposite to the stator 10 toward the positive side of the Y direction is strengthened. Further, magnetic flux advancing from the stator 10 toward the permanent magnets 34a-34e toward the positive side of the Y direction and entering into the S poles of the permanent magnets 34a-34e is strengthened, while magnetic flux advancing from the yoke 31 toward the negative side of the Y direction and entering into the permanent magnets 34a-34e is weakened.

In the linear motor 100 of the present embodiment, the width TW1 of the teeth 32a-32f in the X direction as measured at the yoke side is narrower than the width TW2 in the X direction as measured at the stator side, so that, as compared to the case of the conventional structure, magnetic resistance in the yoke side end part of the teeth 32a-32f is higher, and magnetic flux encounters more difficulty passing therein. Since the width TW1 of the teeth 32a-32f at the yoke side is narrower than the width TW0 of the conventional-art teeth 5, and magnetic resistance in that part is higher by (TW0/TW1) times, the difficulty for magnetic flux to pass therein is increased at that ratio.

Generally, magnetic flux flows more in a direction involving low magnetic resistance and facilitating flow of the magnetic flux, and when magnetic resistance is increased, magnetic flux passing in that part becomes reduced. Accordingly, when magnetic resistance at the yoke side of the teeth 32a-32f is increased, magnetic flux advancing from the teeth 32a-32f toward the yoke 31 in the direction opposite the stator 10 becomes reduced, so that magnetic flux passing through the yoke 31 and connecting to adjacent phases becomes reduced. For this reason, magnetic flux saturation in the yoke 31 is less likely to occur as compared to the case of the conventional-art slider 1, and the height LY of the yoke 31 in the Y direction can therefore be made smaller than the yoke height LY0 in the conventional art shown in FIG. 4. In a case where the height SLH of the slider 20 is to be maintained, by reducing the height LY of the yoke 31 in the Y direction, the height SLTH of the coil-receiving cavities 35 in the Y direction can be increased by that amount as compared to the height SLTH0 of the conventional-art coil-receiving cavities 8 in the Y direction.

As described above, in the U-phase coil core 30 of the linear motor 100 of the present embodiment, the teeth 32a-32f project radially from the yoke 31 toward the stator 10, and the width TW1 of the teeth 32a-32f as measured at the yoke side is narrower than the width TW2 as measured at the stator side. By means of this configuration, when the X-direction length SLL1 and the height SLH of the U-phase coil core 30 are made identical to the length SLL0 and the height SLH0 of the U-phase coil core 1a of the conventional art shown in FIG. 4, the width D in the X direction at the yoke side and the height SLTH in the Y direction of the coil-receiving cavities 35 can be made respectively larger than the width D0 in the X direction and the height SLTH0 in the Y direction of the conventional-art coil-receiving cavities 8, and the cross-sectional area of the coil-receiving cavities 35 can be increased as compared to the cross-sectional area of the conventional-art coil-receiving cavities 8. It is therefore possible, without increasing the volume of the U-phase coil core 30, to increase the amount of the coil 36 wire as compared to the amount of the coil 4 wire in the conventional-art U-phase coil core 1a, thereby enabling an increase in thrust force and a reduction in heat generation in the U-phase coil core 30.

While the details of the structure of the U-phase coil core 30 have been described above, the structures of the W-phase coil core 40 and the V-phase coil core 50 are identical with that of the U-phase coil core 30. When the X-direction length SLL1 and the height SLH of the W-phase coil core 40 and the V-phase coil core 50 are made identical to the length SLL0 and the height SLH0 of the W-phase coil core 1b and the V-phase coil core 1c of the conventional art shown in FIG. 4, the width D in the X direction at the yoke side and the height SLTH in the Y direction of the coil-receiving cavities 45, 55 can be made respectively larger than the width D0 in the X direction and the height SLTH0 in the Y direction of the conventional-art coil-receiving cavities 8, and the cross-sectional area of the coil-receiving cavities 45, 55 can be increased as compared to the cross-sectional area of the conventional-art coil-receiving cavities 8.

Accordingly, in the slider 20 formed by connecting the U-phase coil core 30, the W-phase coil core 40, and the V-phase coil core 50 along the X direction, when the length SLLT1 in the X direction and the height SLH in the Y direction of the slider 20 are made identical to the length SLLT0 in the X direction and the height SLH0 in the Y direction of the slider 1 of the conventional art shown in FIG. 6, the width D in the X direction at the yoke side and the height SLTH in the Y direction of the coil-receiving cavities 35, 45, 55 can be made respectively larger than the width D0 in the X direction and the height SLTH0 in the Y direction of the conventional-art coil-receiving cavities 8, and the cross-sectional area of the coil-receiving cavities 35, 45, 55 can be increased as compared to the cross-sectional area of the conventional-art coil-receiving cavities 8. Therefore, in the linear motor 100 of the present embodiment, it is possible, without increasing the motor volume, to increase the amount of the coil 36 wire of the respective phases as compared to the amount of the coil 4 wire of the respective phases in the conventional art, thereby enabling an increase in thrust force and a reduction in heat generation in the slider 20.

In a case where improvements in characteristics are not particularly necessary, the motor volume may be reduced to achieve downsizing. Specifically, the height SLH of the slider 20 may be made smaller by reducing the height LY of the yoke 31 or the height SLTH of the coil-receiving cavities. Alternatively, since the flowing current value for generating the same amount of thrust force can be reduced, there are less risks of demagnetization of the permanent magnets 34a-34e, so that the width E of the permanent magnets 34a-34e may be made smaller to thereby shorten the overall length of the slider 20.

Although it has been described above that, in the U-phase coil core 30, the angle of slant of the individual teeth 32a-32f relative to each other, the individual coil-receiving cavities 33 relative to each other, and the individual permanent magnets 34a-34e relative to each other is 2θ1, this is not a requirement, and the angle of slant relative to each other may be different. Further, it may be the case that not all of the individual teeth 32a-32f, the individual coil-receiving cavities 33, and the individual permanent magnets 34a-34 project radially. For example, it may be configured such that:
the teeth 32c-32d, the coil-receiving cavity 33, and the permanent magnet 34c, which are located at the central part of the teeth set 32S, extend in the Y direction toward the stator 10 without slanting; the teeth 32a-32b, the coil-receiving cavities 33, and the permanent magnets 34a-34b, which are located at the front part of the teeth set 32S, have their tip parts slanted frontward relative to the Y direction; and the teeth 32e-32f, the coil-receiving cavities 33, and the permanent magnets 34d-34e, which are located at the rear part of the teeth set 32S, have their tip parts slanted rearward relative to the Y direction. This applies similarly to the W-phase coil core 40 and the V-phase coil core 50.

Although it has been described above that the pitch STP of the salient poles 12 of the stator 10 is double the pitch SLP of the teeth 32, it is not particularly necessary that the pitch STP is double. Changes may arbitrarily be made thereto according to the method of control of the linear motor 100 or the number of the teeth 32.

The invention claimed is:
1. A linear motor comprising:
a stator having a plurality of salient poles arranged at uniform intervals along a direction of extension; and
a slider provided facing the stator and configured to move along the direction of extension of the stator,
wherein the slider comprises:
a yoke;
a plurality of teeth projecting from the yoke toward the stator and located sequentially along a direction of movement;
permanent magnets provided in respective magnet-receiving cavities located between the teeth;
coil-receiving cavities formed on outer sides of a teeth set composed of the plurality of teeth; and
a coil wound in the coil-receiving cavities, and
wherein the plurality of teeth project radially from the yoke toward the stator, and a width of each of the teeth as measured at a yoke side is narrower than its width as measured at a stator side, and
widths of all of the teeth as measured at their respective ends at the yoke side are equal to each other.
2. The linear motor according to claim 1, wherein the plurality of teeth project radially from the yoke toward the stator at equiangular intervals.
3. The linear motor according to claim 1, wherein each of teeth located toward the front in the teeth set has its tip slanted frontward relative to a facing direction orthogonal to the direction of movement,
each of teeth located toward the rear in the teeth set has its tip slanted rearward relative to the facing direction, and
a space in front of a front-end tooth located at a front end of the teeth set in the direction of movement and a space behind a rear-end tooth located at a rear end of the teeth set in the direction of movement respectively constitute the coil-receiving cavities.
4. The linear motor according to claim 2, wherein each of teeth located toward the front in the teeth set has its tip slanted frontward relative to a facing direction orthogonal to the direction of movement,
each of teeth located toward the rear in the teeth set has its tip slanted rearward relative to the facing direction, and
a space in front of a front-end tooth located at a front end of the teeth set in the direction of movement and a space behind a rear-end tooth located at a rear end of the teeth set in the direction of movement respectively constitute the coil-receiving cavities.

\* \* \* \* \*